Aug. 29, 1961        H. HÖLLER        2,997,915
FILM PROJECTOR
Filed Aug. 13, 1959
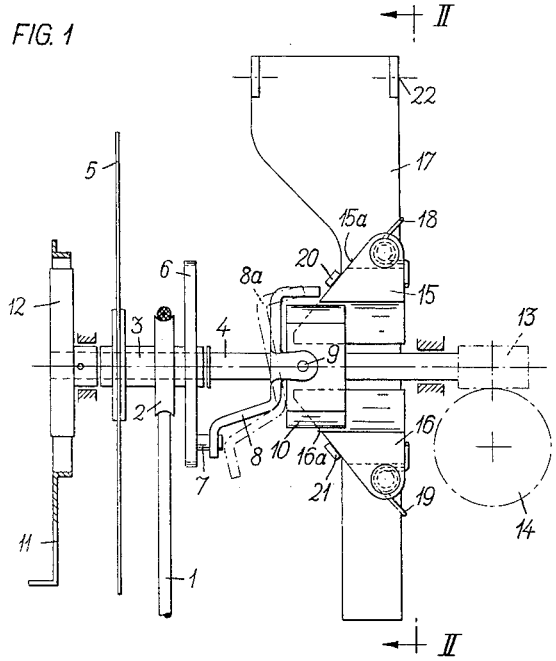
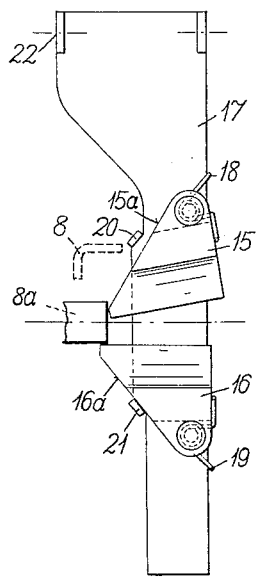
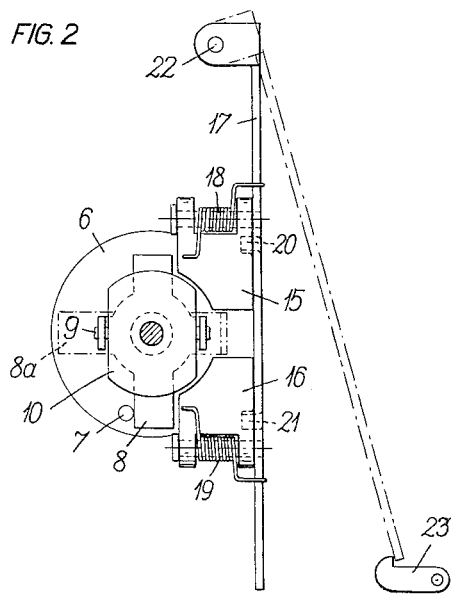

2,997,915
FILM PROJECTOR
Hermann Höller, Vienna, Austria, assignor to Alois Handler and Karl Vockenhuber, Vienna, Austria
Filed Aug. 13, 1959, Ser. No. 833,444
Claims priority, application Austria Aug. 26, 1958
3 Claims. (Cl. 88—17)

The present invention relates to a film projector, comprising means for the projection of stills, being operable on a forward run, as well as a reverse run of the film, comprising a disengageable clutch, releasing the feed mechanism from the projector driving motor.

In a known construction of this kind a clutch part is axially removable, being operatively connected during normal operation by a bolt with a corresponding bolt of the other clutch part. Upon operating the means for the projection of stills, one clutch part is removed in axial direction, whereby the drive of the feed mechanism is interrupted. As on the one hand the clutch can be disconnected in any selected angular position and on the other hand the highest resistances appear during the feed step, the film tape is generally stopped in this construction within the feed step. The shutter remains coupled with the projector motor, so that a vertically removed picture is projected, containing a visible frame-line.

According to another known construction, an electromagnetic clutch is provided between the projector motor and the projector gear, the clutch being releasable on operating the means for projection of stills. In order to assure a quick stopping of the projector gear, a brake magnet is provided. Since the brake effect depends heavily upon the viscosity of the lubricant and thus on the working temperature, as well as on the voltage applied to the brake magnet, a remarkable dispersion in selected time periods results with this construction, which periods are necessary for stopping the projector, so that the latter can come to a stop with the picture removed with respect to the film gate. To avoid this disadvantage a very complicated control means is proposed which should adjust the respective switching moment by using numerous auxiliary relays, as well as a rotating interrupter switch. In spite of the comparatively expensive structure, the brake effect of the brake magnet must be corrected in accordance with the motor speed and all other operating conditions by adjustable regulating means.

It is, therefore, one object of the present invention to provide a film projector, which in a remarkable simple way, compared with known constructions, assures an exact stopping of the picture in the film gate of the projector, avoiding a continuous adjustment of the means for the projection of stills, which is necessary, however, in the known means set forth above. It is another object of the present invention to provide a film projector, wherein the clutch part, which is connected with the feed mechanism of the film, comprises a two-armed lever swingable upon an axis, disposed radially to the clutch axle, and in engagement, for example, by spring tension, with the extension or the like of the second clutch part. In addition two control members having surfaces are provided which are disposed symmetrically relative to a block bearing containing the clutch axle, and defining an open space therebetween. The control surfaces can be brought into alignment with one lever arm, deviating the lever around its axle, blocking it in the notch in such manner that the feed mechanism of the film is disconnected and stopped.

In a known construction a ratchet is arranged on a disk which is fixed on the axle of engaging means, adjoining elastically a gear wheel, which rotates releasably around the clutch axle. By a removable stop the ratchet and the driving axle for the film should be fixed at the moment the tops of the claws are leaving the film channel. As in this arrangement the ratchet is swingable around an axle, running parallel to the clutch axle, an operation of this means for the projection of stills is only possible during a forward run of the film. The operation on the reverse run is impossible by the gear wheel. This is a serious disadvantage for the operation of the apparatus, as it is very useful to operate the means for projection of stills also on the film tape during its reverse running, especially, for finding certain pictures or scenes.

It is, therefore, one object of the present invention to provide a film projector, wherein the control surfaces rise in the direction of the clutch axle, the latter being disposed in the operative position of the means for projection of stills in the course of movement of one lever arm, so that the latter passes along the control surfaces, disengaging the lever from the second clutch part.

It is another object of the present invention to provide a film projector, wherein the control surfaces are arranged swingably at a common carrier, adjoining the stops of the carrier by spring tension, so that on striking one lever arm at one of the control surfaces, the latter yields against the tension of the spring. The lever arm strikes against the front surface of the second control surface and is stopped.

With these and other objects in view, which will become apparent in the following detailed description, the present invention will be clearly understood in connection with the accompanying drawings, in which:

FIGURE 1 shows a side elevation of the apparatus indicating the means for projecting of stills;

FIG. 2 is a front view of the means shown in FIG. 1; and

FIG. 3 is a fragmentary side view of the novel arrangement.

Referring now to the drawings, the film projector comprises a grooved roller 2 which is driven by means of the drive belt by a projector motor (not shown). The roller 2 is secured to a hollow shaft 3, which is rotatably mounted on the axle 4 of the feed mechanism. The shutter 5 and a clutch disk 6 are disposed on the hollow shaft 3 and the clutch disk 6 bears a bolt 7. A bent two-armed lever 8 is provided opposite to the coupling disk 6, which two-armed lever 8 is pivotally mounted at the pivot 9 disposed on the bearing block 10, secured to the axle 4, and is held in the position shown in full lines by a spring (not shown). In this position of the two-armed lever 8 the claw 11 is in operative connection with the projector motor over the control cam 12. A worm 13 is also keyed to the axle 4 and meshes with a worm wheel 14 to drive by means of other driving means (not shown) the feed sprocket and the take-up sprocket.

The means for the projection of stills is operated by two control elements 15, 16, which are mounted pivotally on a carrier 17 by means of tension springs 18, 19, which control elements 15 and 16 about the stops 20, 21, provided on the carrier 17. The control elements 15, 16 are formed as part of a cylinder complementary to the bearing block 10, and have sloping control surfaces 15a, 16a. The carrier 17 is pivotally mounted at the pivot 22 and remains in normal cinematographic projection in the position, shown in dash-dotted in FIG. 2, to be retained in this position by a ratchet 23.

The mode of operation of the arrangement is as follows: If the ratchet 23 is turned in counterclockwise direction, for example, by pressing a key (not shown), the carrier 17 moves into the position illustrated in FIG. 2 in full lines. Upon turning the axle 4 in clockwise direction (FIG. 2), the angular arm 8a of the double-armed lever 8 engages the control surface 15a, whereby the lever 8 is turned against a spring action around the pivot pin 9 and disengaging the lever 8 from the clutch bolt 7. FIG. 1 illustrates the position of the double armed lever 8 in dash-dotted lines in a turned position of 90°, the drive of the feed mechanism being disconnected and blocked. At the same time, with the deviation of the double-armed lever 8, the control element 15 yields, the lever arm 8a striking on the front surface of the control element 16 and stopping the drive of the claw 11. At that moment the claw 11 is moved in the top or bottom dead position, while the shutter 5 is driven further on by the projector motor (not shown). It is only necessary to dissipate the kinetic energy of the control cam 12, since by proper choice of the pitch of the worm 13, the moment of inertia of the following driving parts can be made inactive. The blocking of the lever arm 8a is particularly clear by illustration in FIG. 3, which shows a view corresponding with FIG. 1, omitting the axle 4 with the bearing block 10, to make the construction more understandable. By adjustment of the carrier 17, the projection of stills can be neutralized. Since the controlling means 17 to 21 are of symmetrical design, the process of operation of the projection of stills is exactly alike for both directions of rotation of the axle 4.

It is also possible, to mount the control elements 15 and 16 rigidly and to provide between the control surfaces a notch for the lever. In this case the spring tension acting on the lever 8 must be chosen at a very high level, in order to assure, in spite of the relative high speed of the arm 8a, a safe engagement of the latter.

While I have disclosed one embodiment of the present invention, it is to be understood that this embodiment is given by example only and not in a limiting sense, the scope of the present invention being determined by the objects and the claims.

I claim:

1. A motion picture projector adapted for forward and reverse run of a motion picture film, comprising a feed mechanism for a motion picture film including a first axle, a driving motor, a releasable clutch disposed operatively between said feed mechanism and said driving motor, said clutch comprising a two-armed lever having a first arm and a second arm and being secured to said first axle of said feed mechanism, a pivot pin disposed radially to said first axle of said feed mechanism and carrying said two-armed lever, a second axle disposed coaxially with said first axle of said feed mechanism and driven by said motor, said first axle having an extension engaging during normal projection of the motion picture said first arm of said two-armed lever, a carrier disposed adjacent said first axle and pivotally mounted for turning upon an axis disposed parallel to said first axle, two control elements mounted on said carrier and defining two control surfaces sloping towards said pivot pin of said two-armed lever and disposed symmetrically relative to said first axle and defining an open space therebetween, said control elements and, thereby, said control surfaces being adjustable in the turning direction of said second arm of said double-armed lever, simultaneously disengaging said first arm of said double-armed lever from said extension and stopping said second arm of said double-armed lever in said open space defined between said control surfaces, so that said feed mechanism is stopped in a predetermined position and a still picture is projected.

2. A motion picture projector adapted for forward and reverse run of a motion picture film, comprising a feed mechanism for a motion picture film including a first axle, a driving motor, a releasable clutch disposed operatively between said feed mechanism and said driving motor, a bearing block secured to said first axle, said clutch comprising a two-armed lever having a first arm and a second arm and being secured to said bearing block of said first axle of said feed mechanism, a pivot pin disposed radially to said first axle of said feed mechanism and carrying said two-armed lever, a second axle disposed coaxially with said first axle of said feed mechanism and driven by said motor, said first axle having an extension engaging during normal projection of the motion picture said first arm of said two-armed lever, a carrier disposed adjacent said first axle and pivotally mounted for turning upon an axis disposed parallel to said first axle, two control elements pivotally mounted on said carrier and defining two control surfaces sloping towards said pivot pin of said two-armed lever and disposed symmetrically relative to said bearing block and defining an open space therebetween, said control elements and, thereby, said control surfaces being adjustable in the turning direction of said second arm of said double armed lever, simultaneously disengaging said first arm of said double-armed lever from said extension and stopping said second arm of said double-armed lever in said open space defined between said control surfaces, so that said feed mechanism is stopped in a predetermined position and a still picture is projected.

3. The motion picture projector, as set forth in claim 1, wherein said carrier is spring-biased and has two abutment means disposed within the turning path of said control elements.

References Cited in the file of this patent

UNITED STATES PATENTS

| | | |
|---|---|---|
| 1,732,755 | Kerestes | Oct. 22, 1929 |
| 2,049,944 | Carpenter | Aug. 4, 1936 |
| 2,196,738 | Nagel | Apr. 9, 1940 |